US008483270B2

(12) United States Patent
Houghton et al.

(10) Patent No.: US 8,483,270 B2
(45) Date of Patent: Jul. 9, 2013

(54) METHOD AND SYSTEM FOR ADAPTING USE OF A RADIO LINK BETWEEN A REMOTELY CONTROLLED DEVICE AND AN OPERATOR CONTROL UNIT

(75) Inventors: Ricky A. Houghton, Wexford, PA (US); Richard P. Lizotte, Hudson, NH (US)

(73) Assignee: Ballistic Applications and Materials International, LLC, Butler, PA (US)

( * ) Notice: Subject to any disclaimer, the term of this patent is extended or adjusted under 35 U.S.C. 154(b) by 995 days.

(21) Appl. No.: 12/321,047

(22) Filed: Jan. 15, 2009

(65) Prior Publication Data

US 2009/0185617 A1 Jul. 23, 2009

Related U.S. Application Data

(60) Provisional application No. 61/021,681, filed on Jan. 17, 2008.

(51) Int. Cl.
*H04N 7/12* (2006.01)

(52) U.S. Cl.
USPC ............ 375/240.01; 375/240.26; 348/158; 370/468; 725/139

(58) Field of Classification Search
USPC .................. 375/240.01, 240.26; 348/158
See application file for complete search history.

(56) References Cited

U.S. PATENT DOCUMENTS

| | | | | |
|---|---|---|---|---|
| 5,155,683 A * | 10/1992 | Rahim | | 701/25 |
| 5,904,724 A * | 5/1999 | Margolin | | 701/120 |
| 6,489,986 B1 * | 12/2002 | Allen | | 348/14.01 |
| 7,161,957 B2 * | 1/2007 | Wang et al. | | 370/468 |
| 7,617,516 B2 * | 11/2009 | Huslak et al. | | 725/95 |
| 2005/0111823 A1 * | 5/2005 | Dureau | | 386/46 |
| 2008/0225008 A1 * | 9/2008 | Madonna et al. | | 345/173 |
| 2008/0263621 A1 * | 10/2008 | Austerlitz et al. | | 725/139 |

OTHER PUBLICATIONS

Request for Project Proposals for Robotics Technology Research and Development Effort No. W15QKN-08-9-0001-RPP8, Issued by Army Contracting Command Joint Munitions and Lethality Contracting Center to the National Center for Manufacturing Sciences (NCMS) for the Robotics Technology Consortium (RTC), pp. 1-16, see especially p. 5, enumerated paragraph 3 which details the requirement for bidders to develop a robotic system able to dynamically configure video bandwidth as per the Applicant's invention—Issue Date: Sep. 15, 2010.

* cited by examiner

*Primary Examiner* — Christopher Brown
*Assistant Examiner* — Fahimeh Mohammadi
(74) *Attorney, Agent, or Firm* — Karen Tang-Wai Sutton

(57) ABSTRACT

A method for adapting use of a wireless link, such as a radio link, between a remotely controlled device and an operator control unit, and a remotely controlled device configured to perform the method, the method aimed at providing for more advantageous use of the wireless link in providing video to the operator control unit. In case of a radio link, a video-transmitting radio unit of the remotely controlled device provides a digital video feed over the radio link to a video-receiving radio unit of the operator control unit, and in so doing the remotely controlled device adapts the resolution and/or frames per unit time of the video feed based solely on measurements made by the remotely controlled device, measurements indicative of the quality of the radio link.

9 Claims, 3 Drawing Sheets

METHOD AND SYSTEM FOR ADAPTING USE OF A RADIO LINK BETWEEN A REMOTELY CONTROLLED DEVICE AND AN OPERATOR CONTROL UNIT

CROSS REFERENCE TO RELATED APPLICATION

Reference is made to and priority claimed from U.S. provisional application Ser. No. 61/021,681 filed on Jan. 17, 2008.

FIELD OF THE INVENTION

The invention relates to wireless communications and video compression. More specifically, the invention relates to sending compressed digital video over a wireless data link, such as a radio (communication) link or optical (communication) link.

BACKGROUND OF THE INVENTION

A wireless link, typically enabled by a radio (although possibly enabled by a light source or even a sound source), is used to remotely control an unmanned ground vehicle (UGV) or other unmanned vehicle or device that moves in some respect (e.g. it swivels), all of which are called here a remote controlled device (RCD), from what is here called an operator control unit (OCU). To control the RCD, commands are sent by an operator from the OCU to the RCD using the wireless link, i.e. using e.g. radio signals, and often using radio signals modulated by a digital encoding of the information (commands) to be sent to the RCD.

In the other direction, from the RCD to the OCU, the RCD provides a video signal to the OCU, and the operator of the RCD examines the video signal in deciding what commands to send to the RCD, i.e. in order to remotely control the RCD. The video signal is a stream of images, i.e. a video stream, and, like the commands, the video is typically digitally encoded and in case of a radio-enabled wireless link, it is the digitally encoded video that is used to modulate the radio signal.

The video data stream is a stream of video frames, each at some resolution, which may differ from frame to frame. The operator controls the motion of the RCD, including how fast the RCD moves, e.g. its rate of travel over the ground or its rate of swivel, by sending commands to the RCD over the wireless link, using the available bandwidth of the wireless link.

In radio communications using a modulated carrier, bandwidth, as that term is used here, is the range of frequencies occupied by the modulated carrier, i.e. the range of frequencies for which the Fourier transform of the modulated radio signal is non-zero (or above some minimum level). In digital wireless communication, as mentioned, the information is digitally encoded according to some coding scheme, and it is that information that is used to modulate the carrier, according to one or another modulation scheme (and in some cases there can be a quite blurry line between modulation and coding, even to the extent that the two can be said to be combined, as in trellis coded modulation).

Typically, in remotely controlling an RCD using a digital radio (i.e. using a wireless link enabled by a radio transmitting a radio signal modulated be digitally encoded information), the modulation and coding scheme are fixed, and so the maximum available bandwidth is typically fixed (unvarying). Although the available bandwidth is typically fixed, the quality of the radio link varies, depending on the radio-frequency noise present in the environment, the power used to transmit a signal, and the distance between the RCD and OCU, among other things. If the quality of the radio link degrades too much to accommodate the rate of data being communicated between the radio units, the radio link fails, i.e. communication between the RCD and the OCU is at least temporarily lost. The failure is abrupt in case of using a constant data rate, independent of the quality of the data rate; i.e. in such a case, the operator is surprised. During the time required to reestablish the link, the RCD is out of control (and is usually configured to stop and wait for the radio link to reestablish). Sometimes the link can be reestablished, but if e.g. the RCD is too far away to accommodate the video data and commands, control is lost. The link could also be lost if the RF environment has changed too much, e.g. in case of a hostile attempt to jam communication between the RCD and OCU.

It is therefore desirable to alter the rate at which the RCD sends data to the OCU, to take into account the quality of the radio link.

Some prior art radio communication systems do alter the data rate provided by a radio link, in order to adapt to situations where the radio link is deteriorating. However, such radio links use a more complex communication protocols than are typically used in case of RCDs, namely layered communication protocols that ensure data integrity. These layered communications protocols typically include, at both ends of a communication link, what is sometimes called a network layer (and sometimes called an Internet layer). These so-called peer layers (at the two ends of a link) exchange (in peer-to-peer communication) information useful in determining how to alter the radio link to adapt to changes in the error rate of communication. TCP/IP (Transmission Control Protocol/Internet Protocol) is such a protocol.

In case of RCDs providing video data there is no need to ensure data integrity (since a portion of a video image may be damaged and the video image still serves a useful purpose). Instead of TCP/IP, therefore, RCDs use UDP (User Datagram Protocol), which is a simple protocol that in effect says, "send the data into the world; I don't care about who receives it, I don't care if it ever gets there, just send it." In case of using UDP, there is no network layer providing information indicating how much data has actually been received during a communication.

The prior art also teaches using feedback to an RCD provided by the OCU controlling the RCD, for the RCD to use in determining how to alter the data rate transmitted by the RCD. (It is only the rate of data sent from the RCD to the OCU that is at issue, since the data rate required to send commands to the RCD from the OCU is small.) However, providing such feedback consumes bandwidth, i.e. the wireless link has only so much capacity for communicating information between the OCU and the RCD, and providing feedback from the OCU on the quality of the wireless link eats into that capacity.

In all of this prior art, use of the bandwidth is altered based on some feedback from the OCU.

What is needed is a way to control use of the radio link without relying on information provided by a network layer, since there is typically no such layer, and without relying on any other feedback from the OCU. Ideally, the use of the radio link is an intelligent use that takes into account whether the radio link is better used for more frames at lower resolution, or fewer frames at higher resolution.

DISCLOSURE OF INVENTION

The invention provides for adaptively controlling use of a radio link or other wireless link between a remotely controlled device (RCD) and an operator control unit (OCU), so as to intelligently use of the radio link, given a rate of motion of the RCD and/or given information indicative of the quality of the radio link (or other kind of wireless link, such as an optical link or a sound wave link). Link quality decreases with increased noise or with increased distance between communicating/linked communication units. The adaptive control provided by the invention is based solely on link quality measurements made by the RCD and/or rate of motion information, which must also be known to the RCD for the RCD to be remotely controlled. Thus, the invention does not rely on feedback from the OCU or information from a network layer of a communication protocol.

The invention encompasses using various metrics indicative of link quality, including digital measures of link quality, signal to noise ratio, noise power, and other analog indicators of signal quality. For rate of motion information, the invention encompasses using metrics indicative of how fast the RCD is moving, e.g. its rate of travel, or swivel (pan and tilt), or turning in place, or rate of motion of a manipulator arm.

The invention increases or decreases the overall video data rate, depending on the observed link quality, i.e. depending on the metrics indicative of link quality, and in some embodiments, depending on the rate of motion of the RCD. The overall data rate can be changed in two ways: by using hardware based parameters to change the rate of imaging (i.e. by changing the frames per unit time provided by the video camera at the video-providing radio), or by using hardware based parameters to change the visual/perceived resolution of a frame, i.e. the resolution of a frame as perceived by the operator.

By using hardware based parameters to control the radio link between an RCD and an OCU, the RCD radio (the video-transmitting radio at the RCD, at least, in case the RCD includes a separate radio for receiving commands) can be deployed having no additional bandwidth or infrastructure compared to a conventional (video-transmitting) RCD radio, and yet provide superior performance in at least two ways. First, while the RCD is in motion, an operator at the OCU can discern that loss of the radio link (or other wireless link) to the OCU is more and more likely to occur, based on a progressively poorer resolution picture as the video-providing radio moves away from the operator, and the operator can therefore issue commands to keep the video-transmitting radio in range. Second, while the RCD is stopped by command from the operator, the frame rate can be slowed substantially and the resolution increased, so the operator can see a higher resolution video frame, essentially a high resolution still picture.

BRIEF DESCRIPTION OF THE DRAWINGS

The features and advantages of the invention will become apparent from a consideration of the subsequent detailed description presented in connection with accompanying drawings, in which.

DETAILED DESCRIPTION

The invention is described here in an application in which a wireless link between communicating entities is implemented using radios, i.e. using radiofrequency signaling. It should be clear from the below description, however, that nothing about the invention restricts it to radio-enabled wireless links. The invention could just as well be used in case of a wireless link enabled using light signals, or even sound, instead of radiofrequency signals (radio waves), i.e. the wireless link could be an optical link or a sound wave link (e.g. as enabled by sonar).

Figure 1:
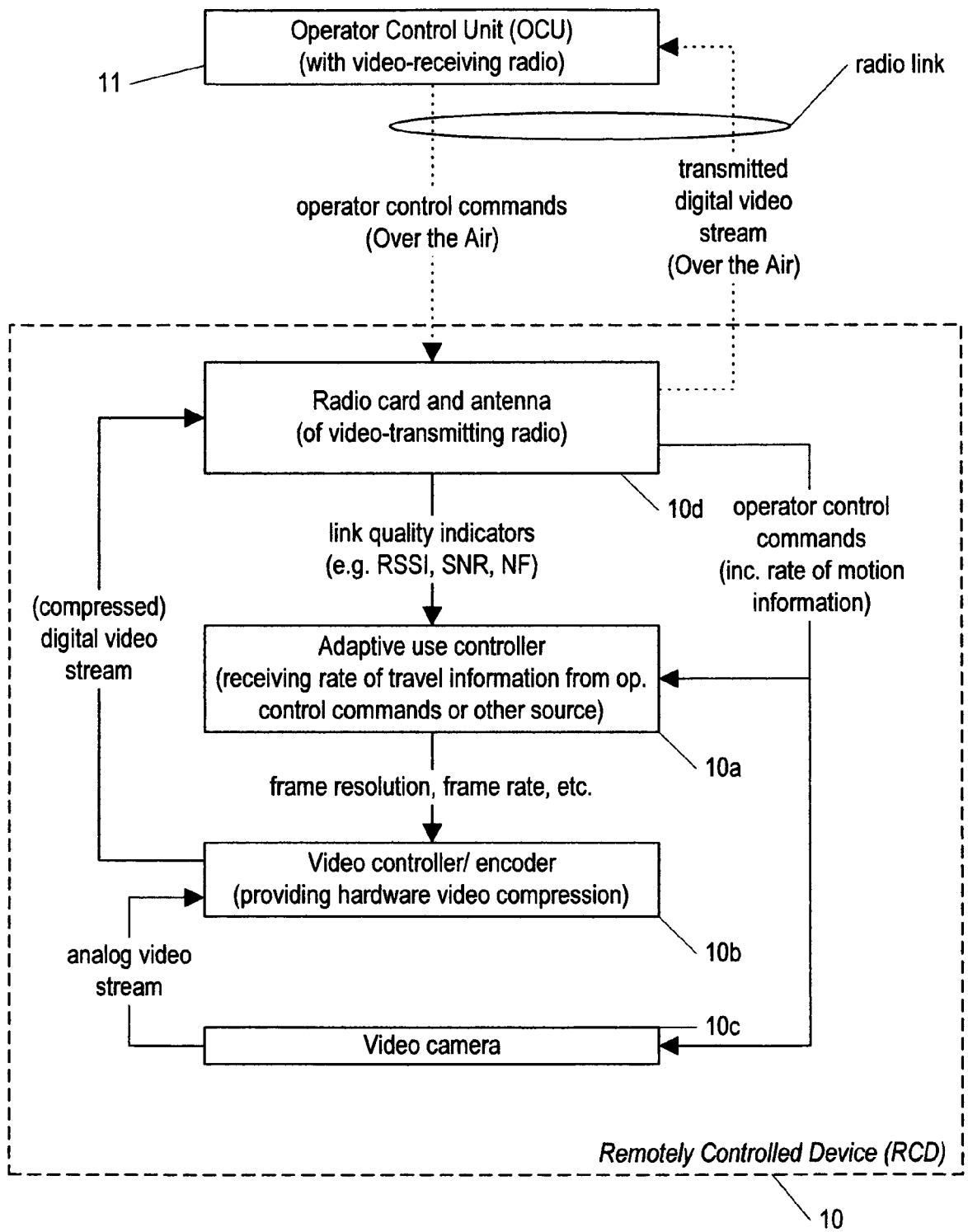
FIG. 1 is part logical and part physical block diagram/flow diagram of an RCD (remotely controlled device) according to the invention, coupled to an OCU (operator control unit) by a radio link.
Figure 2:
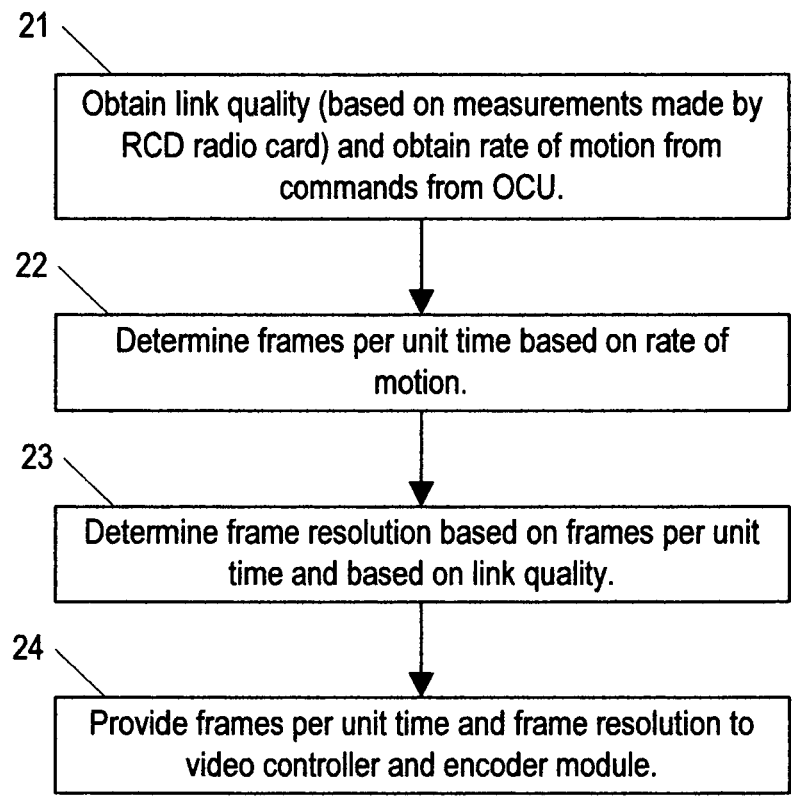
FIG. 2 is a flow chart illustrating how the radio link is controlled to optimize its performance, depending on the quality of the radio link, and depending on how fast the RCD is moving (in one or another respect).

Referring now to FIGS. 1 and 2, the invention provides an adaptive use controller 10a (implemented in hardware or software) for inclusion in an RCD (remotely controlled device), for adapting use of a radio link or other wireless link by which the RCD is controlled from an OCU (operator control unit). The adaptive use controller 10a varies parameters of a hardware based video controller/encoder 10b included in the RCD, in order to vary the rate of data transmitted by the RCD to an OCU (operator control unit) 11 over the wireless link. The video controller/encoder provides a compressed digital video data stream for radio transmission to the OCU based on a typically analog video data stream provided by a video camera 10c included with the RCD.

In case of applications where the wireless link is a radio link, the digital video data stream is provided by a video-transmitting radio 10d (FIG. 1) of the RCD to a video-receiving radio (not separately shown) at the OCU over a radio link connecting the two radios. The video-transmitting radio includes a radio card and antenna. The radio card receives digital information to be transmitted to the OCU, and encodes it and performs modulation of a carrier, according to one or another coding and modulation scheme, and applies the resulting modulated carrier signal to the antenna for wireless transmission to the OCU. The OCU uses the radio link both to receive the digital video data stream and to transmit operator control commands to the RCD. The control commands are received by the antenna and radio card 10d of the RCD, and then provided to the RCD platform 10c.

The radio card also performs various measurements of the received signal, to determine values for one or another metric indicative of link quality. An exemplary metric is the so-called and well-known RSSI (received signal strength indicator). In the description here, the values of such metrics are sometimes called hardware parameters, and sometimes called measurements. Both of these terms are to be understood as referring to values of metrics of link quality. For example, in case of signal to noise ratio (SNR) being used as a metric for link quality, the radio card might provide a signal strength value and a noise value, or it might provide the ratio of these two values. All three of these values are encompassed by the term (values of) metrics of link quality here, and may also be called, more simply, (values of) indicators of link quality. Another possible metric of link quality, as shown in FIG. 1, is the well known noise floor (NF).

In some embodiments and as shown in FIG. 1, the control commands are also provided to the adaptive use controller 10a, so that the adaptive use controller can determine the rate of motion of the RCD 10, where such motion can be travel over ground, or swivel (in pan and tilt operations), or turning in place, or motion of a manipulator arm. (In embodiments using ethernet connectivity to communicably connect the various modules of the RCD 10, the radio card of the video-transmitting radio 10d would simply provide packets to the RCD platform 10c indicating the commanded rate of motion, and both the RCD platform 10c and the adaptive use controller 10a would read the packets.)

Besides relying on commands from the OCU 11 to determine the rate of motion of the RCD 10, in case of rate of motion that is a rate of travel (motion over the ground), such rate of motion may be determined using a global positioning system (GPS), or from information provided by the RCD itself.

As explained in more detail below, the adaptive use controller 10a intelligently adapts parameters of the video controller/encoder 10b (i.e. the video parameters) based on link quality as indicated by the state of the wireless radio card of the RCD, or in other words based on values of the parameters of the radio card, such as the signal to noise parameter value, the RSSI (Received Signal Strength Indicator) parameter value, and/or other radio card state variables, including digital measures of link quality. Further, in a preferred embodiment, the adaptive use controller takes into account the rate of travel of the RCD in determining how to use the radio link, e.g. to transmit more frames per unit time at lower resolution, or fewer frames at higher resolution, or fewer frames at lower resolution, or more frames at higher resolution.

For such control of the use of the radio link, the adaptive use controller 10a continually provides a frame rate parameter and a frame resolution parameter (or equivalent parameter values) to the video controller/encoder 10b, which then compresses each frame to obtain the indicated resolution.

The video camera, in a typical embodiment, produces an analog signal, having what is here assumed to be a constant inherent resolution, and the video controller/encoder compresses the analog signal more or less, in order to achieve the indicated resolution. In this process the output of the camera is digitally converted, producing some number of pixels providing what is here called the camera resolution. The indicated resolution is then achieved by performing compression at a level of compression corresponding to the indicated resolution. For example, the camera resolution might be 640*480 pixels, each of which may differ. But the level of compression corresponding to the indicated resolution might result in using only every fourth pixel in a group of four adjacent pixels for all pixels in the group, or taking some sort of average of every four pixels in the group and using the average for all four pixels in the group. Thus, in such a case, the indicated resolution will be less than the camera resolution.

In some embodiments, the adaptive use controller 10a can command the camera resolution too. In case of an analog camera, a command to alter the camera resolution would alter the analog to digital conversion of the analog output of the camera, changing the number of pixels used to digitize a frame. In case of a digital camera, such a command would simply alter the number of pixels per frames provided by the digital camera.

FIG. 2 illustrates operation of the adaptive use controller 10a (shown in FIG. 1) in a typical embodiment, and in particular in an embodiment in which both link quality and rate of motion are used to determine use of the radio link, by adjusting both the frames per unit time and the frame resolution. In a first step 21, the adaptive use controller obtains link quality information from the radio card 10d, and obtains rate of motion information from commands sent from the OCU. (In other embodiments, the rate of motion may be determined by equipment onboard the RCD, such as a GPS or motion controllers used by the RCD to control the motion of one or another component of the RCD, such as wheels.)

In a next step 22, the adaptive use controller determines a value to set for frames per unit time, based on the rate of motion. (In some embodiments, the frame rate may be adjusted based instead on the link quality.) Then, in a next step 23, the adaptive use controller determines the frame resolution based on both the link quality and the frame rate, so that the overall data rate (essentially the frame rate multiplied by the frame resolution) does not overwhelm the radio link. Finally, in a last step 24, the adaptive use controller provides the frame resolution and frame rate to the video controller/encoder 10b.

In a typical embodiment, lookup tables would be used for determining frame rate based on rate of motion, and for determining frame resolution based on frame rate and link quality. These tables would be determined, advantageously, by trial and error, i.e. empirically.

The adaptive use controller 10a can be implemented in hardware (as e.g. an application specific integrated circuit) or as a processor configured by software, i.e. by instructions stored in a memory device/storage medium, in a form suitable for execution by the processor, which are then loaded into the processor to configure the processor.

Each of the above steps may be implemented in software, as discrete modules. In case of implementing the adaptive use controller as software, each of the modules may be implemented as discrete modules for execution by a microprocessor included in the RCD. While the different steps may be readily identifiable as being implemented by discrete modules, the different steps may instead be implemented as all integrated into a single module. In either case, the modules or components of the overall module that perform the steps are to be understood as distinct components of the invention, in the embodiment illustrated in FIG. 2.

In some embodiments, only the link quality is used to adjust use of the radio link, and the link quality in some such embodiments is used only to adjust the level of compression, which affects only the resolution per frame. In such embodiments, again, lookup tables may be used to determine what level of compression to use given a value for link quality (such as an RSSI value). As mentioned above, such a lookup table would typically be constructed based on trial and error. Such tables would e.g. provide that for an RSSI between two values indicated in the tables, a level of compression indicated in the table would be used.

In the description up to this point, the invention calls for adjusting the resolution and/or frame rate in adapting use of the wireless link. Such adjusting of the resolution and/or frame rate, based on a value of an indicator of link quality and possibly also based on a value for rate of motion of the RCD, can be called video throttling. (As explained above, however, the video throttling performed here is based only on information available at the RCD, including the rate of motion information since the rate of motion must be known to the RCD via command from the OCU in order for the RCD to in fact be remotely controlled.)

It should be understood, though, that for performing video throttling the invention encompasses changing coding and/or modulation in combination with adjusting the resolution and/or frame rate. Changing coding and/or modulation is sometimes called adaptive coding and modulation, and is known in the art.

It should also be understood that the indicators of link quality are, more accurately, in some embodiments such as those described above, indicators of the quality of the link from the OCU to the RCD. The quality of the link in the other direction is not necessarily the same, since the coding and modulation scheme can be different in the two directions. For example, the modulation used to transmit to the RCD might be 16 QAM (quadrature amplitude modulation), whereas to transmit to the OCU, 64QAM might be used, which allows for a greater data rate albeit at a usually higher error rate. Despite this, an underlying assumption used to arrive at the invention is that the indicator of the quality of the link from the OCU to the RCD is relevant for determining how to adapt use of the RCD to OCU link in order to (indirectly) adapt use of the OCU to RCD link and so maintain control of the RCD.

In an exemplary embodiment of the invention, OFDM is used for modulation. The carrier frequency for the RCD to OCU is the same as for the other direction, and time division duplex (TDD) is used to allow both the OCU and the RCD to share the carrier. The use of the carrier is asymmetric, allowing for more data to be sent from the RCD than from the OCU. Further, the proportion of time the RCD has access to the carrier and the proportion of time the OCU has access changes, according to an algorithm, to allow for efficient use of the carrier, i.e. to allow for efficient use of the radio links in the two directions. According to a typical embodiment of the invention, the data rate for communication (of commands, etc.) from the OCU to the RCD is fixed, i.e. it is not adjusted; only the data rate for communication (of video, etc.) from the RCD to the OCU is varied. Even though the RCD and the OCU use different time intervals, if the RCD sends data at too high a rate in its time interval, packets from the OCU conveying commands to the RCD are dropped by the RCD, which results in a loss of control of the RCD. The loss of control may be temporary, so that the radio link is not actually dropped, or may be permanent, requiring that the link be re-established.

In this exemplary embodiment, the coding and/or modulation scheme used by the RCD is changed (but not the coding and/or modulation scheme used by the OCU) along with the resolution and/or frames per unit time of the video feed sent to the OCU from the RCD, in order to effectively use the radio link. For example, as RCD moves further from the OCU, the resolution and/or frames per unit time are adjusted to decrease the rate of data sent to the OCU, but at some point, instead of further decreasing the data rate by adjusting the resolution and/or frames per unit time, the modulation scheme is changed to one in which each modulation symbol corresponds to a smaller number of bits. For example, the modulation scheme is changed from 64 QAM, in which each modulation symbol (a level value) corresponds to 6 bits, to 16 QAM, in which each modulation symbol (a level value) corresponds to 4 bits. When the modulation scheme is so changed, the RCD may then continue to adjust the resolution and/or frames per unit time, although it may even happen that the resolution and/or frames per unit time are increased momentarily, before again being reduced as the RCD movers further from the OCU.

Figure 3:
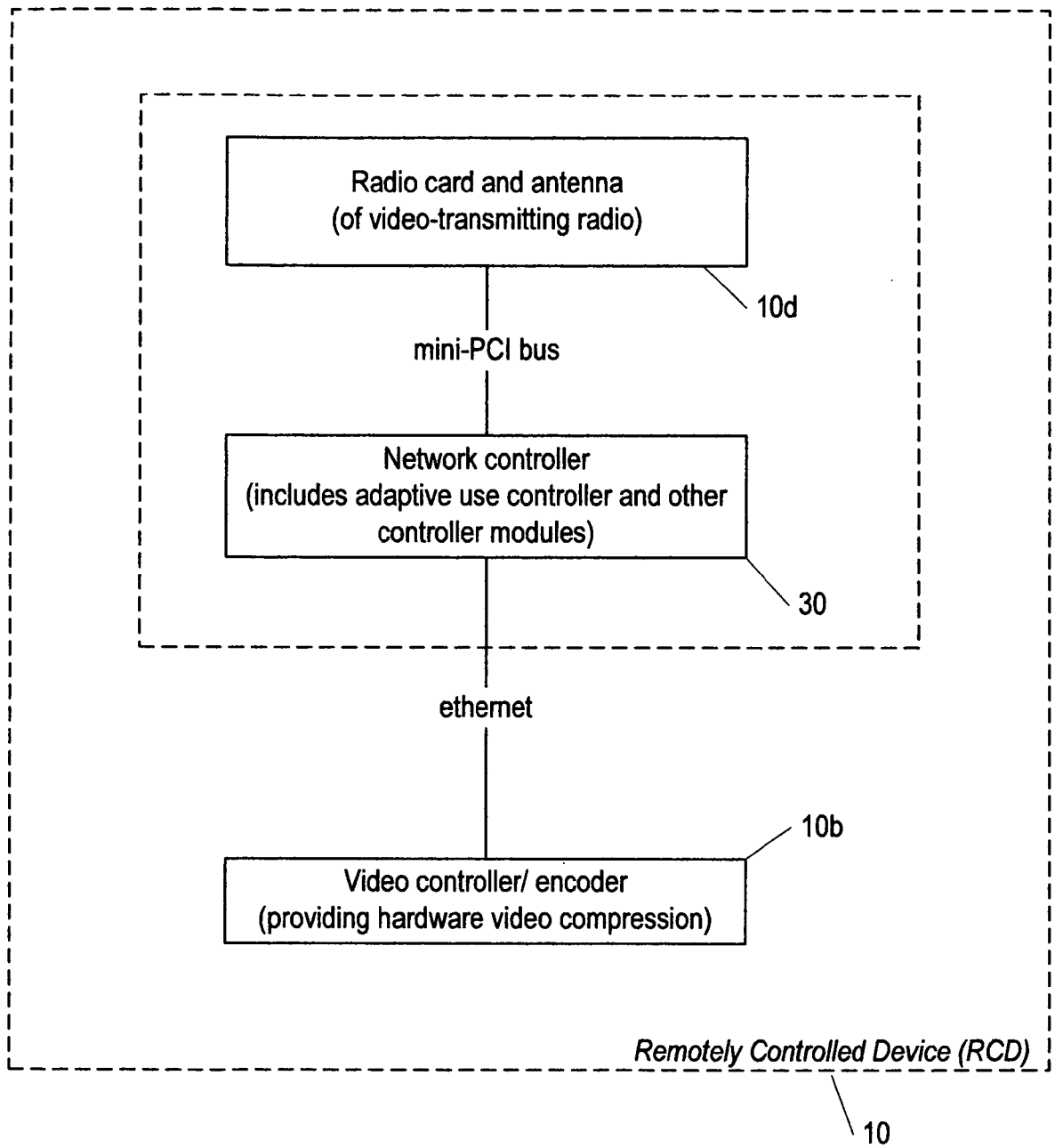
FIG. 3 is a physical block diagram of an RCD according to the invention.

Referring now to FIG. 3, an RCD typical of the sort in which the invention is practiced is shown as including the radio card and antenna 10d and the video controller/encoder 10b, both also shown in FIG. 1, along with a network controller 30, including the adaptive use controller 10a also shown in FIG. 1. As can be seen from FIG. 3, there is no direct connection between the video controller/encoder 10b and the radio card and antenna 10d. The direct communication between the video controller/encoder 10d and the radio card and antenna 10d shown in FIG. 1 is only apparent; in fact, in a typical embodiment of the sort represented (logically) by FIG. 1, the encoded video is provided to the radio card and antenna 10d via the network controller 30. Communication between the video controller/encoder and the network controller is via an ethernet, and communication between the network controller and the radio card is via a so-called mini-PCI bus. It should be understood, however, that the invention encompasses other architectures and communication mechanisms between discrete components, besides ethernet and mini-PCI bus systems.

It should also be noted that the invention encompasses embodiments in which either the OCU or the RDC or both include more than one radio card, and in particular, one radio for the video and one for commands. Thus, it should be understood that the radio card shown in FIGS. 1 and 3 may be two different radio cards, one for transmitting (the video stream) and one for receiving (commands from the OCU), and there may be more than one radio card at the OCU, again, one for receiving (the video stream) and one for transmitting (commands to the RCD).

In some such embodiments, i.e. where there is more than one radio card at both ends of the radio link, the adaptive use controller 10a (FIG. 1) may obtain the SNR (signal to noise ratio) value or the NF (noise floor) value for the radio at the RCD transmitting the video from the RCD to the OCU. In this case, use of the RSSI as an indicator of link quality is not an option. Alternatively, the other radio may be used as a source of a value for the quality of the radio link, i.e. the radio used for receiving the commands from the OCU. In the latter case, use of the RSSI as an indicator of link quality is also an option, along with SNR and NF.

A radio card of the sort that can be used in practicing the invention can be obtained from various manufactures, and can be described as a standard Wi-Fi mini-PCI radio card with a mini-PCI interface.

A network controller of the sort that that can be used in practicing the invention can be obtained from various manufactures, and can be described as a card having a mini-PCI interface and also an ethernet interface, along with a microcontroller and sufficient memory to store software for implementing at least the adaptive use controller. The memory on the network controller would likely also be used to store software providing other functionality. The inventors typically use a network controller card having 32 Mbytes of memory.

A video controller/encoder of the sort that that can be used in practicing the invention can be obtained from various manufactures, and can be described as a card providing any video encoder functionality, as long as it allows altering at least compression schemes in real time (i.e. without having to reset or shut down the video controller/encoder), and advantageously, also allows altering encoding schemes in real time.

Finally, it is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for adapting use of a wireless link by a remotely controlled device communicating a video stream to an operator control unit used to control the remotely controlled device, the method comprising the steps of:
   obtaining at the remotely controlled device a value for quality of the wireless link from measurements performed by the remotely controlled device;
   determining, at least in part, directly from the value of the quality of the wireless link, at least one of a value of frames per unit time, a value of frame resolution, and a level of compression; and
   providing the compressed video stream for transmission from the remotely controlled device to the operator control unit using at least one of the value of frames per unit time, the value of frame resolution, and the level of compression of each frame;

wherein the remotely controlled device performs each step continuously and in real time;

wherein the remotely controlled device self-determines how to perform each step independently without preset per device static parameters directing how the steps are performed;

wherein the remotely controlled device performs each step without relying on feedback information from a network layer of a communication protocol; and wherein the operator control unit used to control the remotely controlled device via the wireless link controls at least one of the remotely controlled device's motion, physical location relative to the operator control unit, and functions separate and distinct from the steps performed by the remotely controlled device as it dynamically adapts the wireless link.

2. A method as in claim 1, wherein in determining the value of frames per unit time or the value of frame resolution, the remotely controlled device performs the steps of:

obtaining a value for rate of motion of the remotely controlled device;

determining the value of frames per unit time based on the value for rate of motion; and determining the value for frame resolution based on the value of frames per unit time and based on the quality of the wireless link.

3. A method as in claim 1, wherein the wireless link is a radio link.

4. A method as in claim 1, wherein the wireless link is an optical link.

5. A method as in claim 1, wherein the wireless link is a sound wave link.

6. A remotely controlled device, configured for adapting use of a wireless link by the remotely controlled device in communicating a video stream to an operator control unit used to control the remotely controlled device, comprising:

video throttling means, for obtaining a value for quality of the wireless link from measurements performed by the remotely controlled device, and based at least in part, directly or indirectly on at least one of the value for quality of the wireless link, a value of frames per unit time, and a value of frame resolution; and video controller/encoder means, for using at least one of the value of frames per unit time, the value of frame resolution, and at least a level of compression of each frame in providing the compressed video stream for transmission from the remotely controlled device to the operator control unit;

wherein the video throttling means is configured to: obtain a value for rate of motion of the remotely controlled device;

determine the value of frames per unit time based on the value for rate of motion; and determine the value for frame resolution based on the value of frames per unit time and based on the quality of the wireless link.

7. A remotely controlled device as in claim 6, wherein the wireless link is a radio link.

8. A remotely controlled device as in claim 6, wherein the wireless link is an optical link.

9. A remotely controlled device as in claim 6, wherein the wireless link is a sound wave link.

* * * * *